United States Patent Office 3,585,191
Patented June 15, 1971

3,585,191
ANDROSTANE DERIVATIVES
Arthur F. Marx and Hermanus J. Kooreman, Delft, Netherlands, assignors to Koninklijke Nederlandsche Gist-En Spiritusfabriek N.V., Delft, Province of South Holland, Netherlands
No Drawing. Filed Sept. 9, 1969, Ser. No. 856,467
Claims priority, application Great Britain, Sept. 11, 1968, 43,295/68
Int. Cl. C07c *173/00*
U.S. Cl. 260—239.55    12 Claims

ABSTRACT OF THE DISCLOSURE

14α,17α - alkylidenedioxy- and 14α,17α - benzylidenedioxy-androstane-3-one compounds having a 11β-acetoxy or halogen substituent are disclosed. The new compounds possess progestational activity.

BACKGROUND OF THE INVENTION

This invention relates to new therapeutically useful steroids of the androstane series, to processes for their preparation and to pharmaceutical compositions containing them.

SUMMARY OF THE INVENTION

New steroids have been discovered which are 14α,17α-methylenedioxy-androstane derivatives of the formula

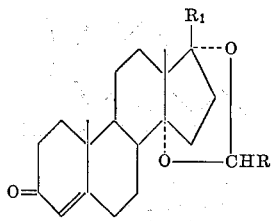

(1)

wherein R represents an aliphatic hydrocarbon group having less than 6 carbon atoms or a phenyl group and $R_1$ represents an acetoxy group or a halogen atom.

It has been found that the androstane derivatives of Formula 1 are therapeutically useful compounds possessing progestational activity. The compounds give positive results in the ovulation-inhibition test, the pregnancy-delay test and the deciduoma test. However, some of the compounds. while active in the two first mentioned tests, are not active in the last mentioned test. The dissociation in activities is an interesting and important aspect of this invention.

DESCRIPTION OF THE PREFERRED EMBODIMENTS

The 14α,17α-methylenedioxy-androstane derivatives of Formula 1 may be prepared by methods known per se for the preparation of analogous compounds. By the term "methods known per se" is meant methods heretofore used or described in the chemical literature.

According to a feature of the invention the androstane derivatives of Formula 1, wherein $R_1$ represents an acetoxy group, are prepared by reacting 14α,17α-dihydroxy-progesterone with an aldehyde of the formula RCHO, wherein R is as hereinbefore defined, followed by converting the thus obtained 14α,17α-methylenedioxy derivative of the formula

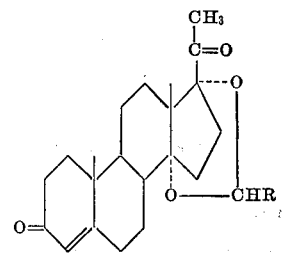

(2)

wherein R is as hereinbefore defined, to the corresponding 17β-acetoxy-androstane derivative in manner known per se. The 14α,17α-methylenedioxy-progesterone derivatives of Formula 2 are disclosed in our copending U.S. patent application Ser. No. 712,600 which application is incorporated herein by reference.

Preferably the reaction of 14α,17α-dihydroxyprogesterone with an aldehyde of the formula RCHO is carried out at room temperature in the presence of a strong acid as catalyst and, if desired, in an inert organic medium. Preferred catalysts are perchloric acid, p-toluenesulphonic acid, sulphuric acid and hydrochloric acid. Suitable solvents include dioxane, tetrahydrofuran, benzene and dimethylformamide.

The conversion of a 14α,17α-methylenedioxyprogesterone derivative of Formula 2 to the corresponding 17β-acetoxy-androstane derivative of Formula 1, is preferably carried out in five subsequent reaction steps.

(a) Protection of the 3-keto group; this protection can be obtained for example by reacting a progesterone derivative of Formula 2 with a trialkyl orthoformate of the formula $(R_2O)_3CH$, wherein $R_2$ represents an alkyl group having less than 5 carbon atoms, to give a 3-alkoxy-14α,17α - methylenedioxy - 3,5 - pregnadiene - 20 - one derivative of the formula

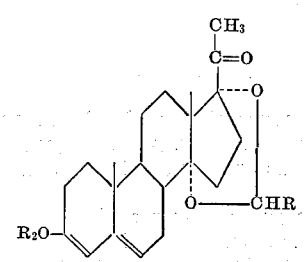

(3)

wherein R and $R_2$ are as hereinbefore defined. The reaction is preferably carried out in an inert organic solvent medium, such as dioxane, in the presence of a small amount of a strong acid, such as p-toluenesulphonic acid, at room temperature.

(b) A compound of Formula 3 is then converted with hydroxylamine to the corresponding 20-oximino derivative of formula

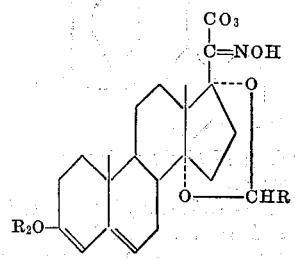

(4)

wherein R and $R_2$ are as hereinbefore defined. The reaction is preferably carried out in an aqueous solution of an alkali metal hydroxide at room temperature.

(c) The 3-alkoxy compound of Formula 4 is converted again to the corresponding 3-keto derivatives, for example by treatment with a strong acid, such as hydrochloric acid, in a suitable organic solvent, such as methanol. A 3-keto-20-oximinoprogesterone derivative of Formula

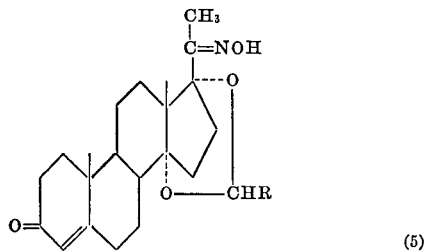

(5)

wherein R is as hereinbefore defined is obtained.

(d) A compound of Formula 5 then is subjected to a Beckmann rearrangement to prepare the corresponding 17β-acetylamino-androstane derivative of the formula

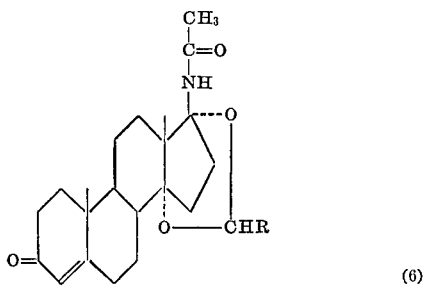

(6)

wherein R is as hereinbefore defined. The reaction is preferably carried out with phosphorus oxychloride in pyridine at a temperature somewhat below room temperature, for example 5–10° C.

(e) Finally, 17β-acetylamino-androstane derivative of Formula 6, is converted to the corresponding 17β-acetoxy-androstane derivative of Formula 1, wherein R is as hereinbefore defined and $R_1$ represents an acetoxy group. The conversion can be effected with a nitrosating agent, such as nitrosyl chloride. The reaction is preferably carried out in an acetic acid and acetic anhydride containing medium in the presence of potassium acetate at a temperature somewhat below room temperature, for instance 5–10° C.

All the compounds of Formulas 3, 4, 5 and 6 are new and particularly useful in a preferred procedure for preparing compounds of Formula 1 and form a feature of the invention.

According to another feature of the invention, it has been found that the androstane derivatives of Formula 1, wherein $R_1$ represents a halogen atom and R is as hereinbefore defined, are prepared by reacting 14α,17α-dihydroxy-4-androsten-3-one-17β-carboxylic acid with an aldehyde of the formula RCHO, wherein R is as hereinbefore defined, followed by converting the thus obtained 14α,17α-methylenedioxy derivative of the formula

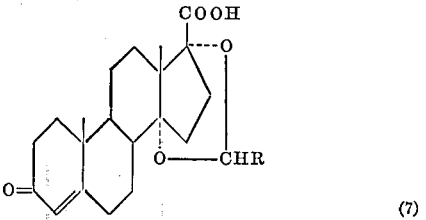

(7)

to the corresponding 17β-halo-androstane derivative in a manner known per se.

The reaction of 14α,17α-dihydroxy-4-androsten-3-one-17β-carboxylic acid with an aldehyde of the formula RCHO can be carried out in the same manner as described above for the corresponding reaction with 14α,17α-dihydroxyprogesterone.

The starting material in the above process, 14α,17α-dihydroxy-4-androsten-3-one-17β-carboxylic acid, may be prepared by oxidation of 14α,17α,21-trihydroxyprogesterone (14α,17α,21-trihydroxy-4-pregnene-3,20-dione). A suitable oxidation agent is for example periodic acid ($H_5IO_6$); the reaction is carried out in an inert organic medium, such as tetrahydrofuran, at room temperature.

A compound of Formula 7 is converted to the corresponding 17β-halo derivative by means of a modified Hunsdiecker reaction (J. Org. Chem. 1961, 26, 280). The reaction is carried out in the presence of lead tetraacetate and in a suitable organic solvent medium, such as benzene or carbon tetrachloride. Chlorine can be provided in this reaction by, for example, lithium chloride; iodine is preferably added as such to the reaction mixture. In the preparation of the 17β iodoandrostane derivatives the reaction mixture is preferably illuminated with a tungsten lamp.

According to a modification of this procedure to prepare 17β-halo-androstane derivatives of Formula 1, first 14α,17α,21-trihydroxyprogesterone is reacted with an aldehyde of the formula RCHO, wherein R is as hereinbefore defined, in the same manner as described above, to give the corresponding 14α,17α-methylenedioxy derivative. Preferably, the 21-hydroxyl group is protected, for example by converting it with acetic anhydride in pyridine to the 21-acetoxy group, before carrying out the reaction with an aldehyde of the formula RCHO. After the introduction of the 14α,17α-methylenedioxy group the 21-acetoxy group can then be converted again to the 21-hydroxy group, for example by alcoholysis with sodium methanolate in methanol. There is obtained a 21-hydroxy-14α,17α-methylenedioxy progesterone derivative of formula

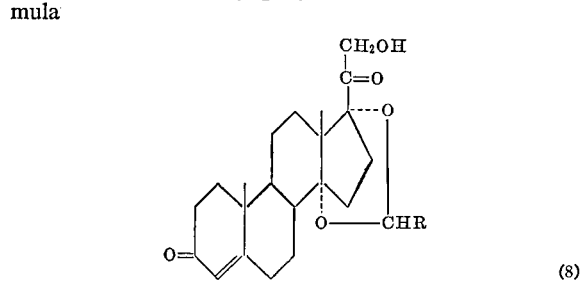

(8)

wherein R is as hereinbefore defined.

A progesterone derivative of Formula 8 may then be oxidized to the corresponding androstane-17β-carboxylic acid of Formula 7, for example with sodium bismuthate. As already indicated above, a compound of Formula 7 may be converted directly to the corresponding 17β-halo-androstane derivative of Formula 1.

The compounds of Formulas 7 and 8 are new compounds which are particularly useful in a preferred procedure for the preparation of compounds of Formula 1 and as such form a feature of the invention.

EXAMPLE I (a) To a solution of 20 g. of 14α,17α,21-trihydroxy-4-pregnene-3,20-dione in a mixture of 300 ml. of tetrahydrofurane and 45 ml. of water was added a solution of 19.5 g. of periodic acid ($H_5IO_6$) in 78 ml. of water at such a rate that the addition was completed in about 15 minutes. The mixture was kept at 25° C. for 2.5 hours; then 280 ml. of water were added and the mixture was concentrated in vacuo. The crystals formed were collected, washed with water and dried in vacuo. Yield: 17.5 g. of 14α,17α-dihydroxy-4-androsten-3-one-17β-carboxylic acid.

Melting point: 200–205° C.

I.R. (in KBr): $\nu_{max}$=3320, 2650, 2580, 1725, 1660, 1619 and 1198 cm.$^{-1}$.

(b) A solution of 1.0 g. of 14α,17α-dihydroxy-4-androsten-3-one-17β-carboxylic acid in a mixture of 6 ml. of paraldehyde, 6 ml. of dioxane and 0.05 ml. of 70% perchloric acid was kept at room temperature for 4 hours. The mixture was neutralized with a few drops of pyridine; the steriod percipitated on addition of 30 ml. of water. Yield: 0.9 g. of 13α,17α-ethylidenedioxy-4-androsten-3-one-17β-carboxylic acid.

Melting point: 228–230° C.
I.R. (in CHCl$_3$): $\nu_{max}$=3435, 1770, 1708, 1664 and 1614 cm.$^{-1}$.

(c) A mixture of 4.0 g. of 14α,17α-ethylidenedioxy-4-androsten-3-one-17β-carboxylic acid, 5.5 g. of lead tetraacetate, 0.46 g. of lithium chloride and 130 ml. of benzene was refluxed under nitrogen for 30 minutes. The cooled mixture was diluted with 300 ml. of methyl isobutyl ketone, washed with water and the solvent evaporated in vacuo to give a residue which was crystallized from methanol/water and then from acetone. Yield: 0.85 g. of 17β-chloro-14α,17α-ethylidenedioxy-4-androsten-3-one.

Melting point: 137–138° C.

$\lambda_{max}$ (in methanol) =240 nm.; $E_{1\,cm.}^{1\%}$=470

I.R. (in CHCl$_3$): $\nu_{max}$=1665, 1614, 1408 and 1101 cm.$^{-1}$.
N.M.R. (in CDCl$_3$): δ=1.07, 1.19, 1.36 (doublet), 5.19 (quadruplet and 5.74 p.p.m.
Elementary analysis:
Calculated for C$_{21}$H$_{29}$O$_3$Cl (percent): C, 69.14; H, 7.96; Cl 9.74. Found (percent): C, 68.75; H, 7.92; Cl 10.03.

EXAMPLE II (a) According to the procedure described in Example Ib, 14α,17α-dihydroxy-4-androsten-3-one-17β-carboxylic acid (prepared according to the procedure of Example Ia) was converted with hexanal to 14α,17α-hexylidenedioxy-4-androsten-3-one-17β-carboxylic acid.

Melting point: 176–177° C.
N.M.R. (in CDCl$_3$): δ=0.90 (triplet), 1.03, 1.22, 5.03 (triplet) and 5.83 p.p.m.

(b) According to the procedure described in Example Ic, 14α,17α-hexylidenedioxy-4-androsten-3-one-17β-carboxylic acid was converted to 17β-chloro-14α,17α-hexylidenedioxy-4-androsten-3-one, isolated as an oil.

$\lambda_{max}$ (in methanol) =242 nm.; $E_{1\,cm.}^{1\%}$=380

I.R. (in CHCl$_3$): $\nu_{max}$=1665, 1613, 1160 and 1109 cm.$^{-1}$.
N.M.R. (in CDCl$_3$): δ=0.87 (triplet), 1.07, 1.20, 5.02 (triplet) and 5.77 p.p.m.
Molecular ion peak in mass spectrum:
Calculated for C$_{25}$H$_{37}$O$_3$Cl: 420/422. Found: 420/422.

EXAMPLE III (a) According to the procedure described in Example Ib, 14α,17α-dihydroxy-4-androsten-3-one-17β-carboxylic acid (prepared according to the procedure of Example Ia) was converted with benzaldehyde to 14α,17α-benzylidenedioxy-4-androsten-3-one-17β-carboxylic acid.

Melting Point: 247–248° C.
N.M.R. (in CDCl$_3$): δ=1.10, 1.20, 5.77 and 7.3–7.6 (multiplet) p.p.m.

(b) According to the procedure described in Example Ic, 14α,17α-benzylidenedioxy-4-androsten-3-one-17β-carboxylic acid was converted to 17β-chloro-14α,17α-benzylidenedioxy-4-androsten-3-one, isolated as an oil.

$\lambda_{max}$ (in methanol): 240.5 nm.; $E_{1\,cm.}^{1\%}$=390

I.R. (in CHCl$_3$): $\nu_{max}$=1668, 1615, 1092 and 990 cm.$^{-1}$.
N.M.R. (in CDCl$_3$): δ=1.15, 1.20, 5.77, 6.02 and 7.3–7.7 (multiplet) p.p.m.
Highest mass numbers in mass spectrum:
Calculated for C$_{26}$H$_{31}$O$_3$Cl: 426/428. Found: 320/322 [according to molecular weight −106 (=mol. weight C$_6$H$_5$]CHO).

EXAMPLE IV (a) A solution of 25 g. of 14α,17α,21-trihydroxyprogesterone in a mixture of 100 ml. of pyridine and 25 ml. of acetic anhydride was kept at room temperature for 4 hours. Then 150 ml. of water were added and the precipitate was collected, washed with water and dried in vacuum. Yield: 27.5 g. of 14α,17α-dihydroxy-21-acetoxyprogesterone.

Melting point: 229–231° C.
I.R. (in CHCl$_3$): $\nu_{max}$=3616, 3480, 1742, 1729, 1663, 1613 and 1373 cm.$^{-1}$.

(b) A mixture of 27.5 g. of 14α,17α-dihydroxy-21-acetoxyprogesterone, 100 ml. of paraldehyde, 200 ml. of methylene chloride and 2.5 ml. of 70% perchloric acid was agitated at room temperature for 15 minutes. Then the mixture was washed with a N aqueous solution of sodium bircarbonate and with water. The organic layer was evaporated to dryness in vacuo and the residue crystallized from methanol. Yield: 23.7 g. of 14α,17α-ethylidenedioxy-21-acetoxyprogesterone.

Melting point: 177–179° C.
I.R. (in CHCl$_3$): $\nu_{max}$=1747, 1730, 1665, 1612, 1112 and 1070 cm.$^{-1}$.

(c) To a solution of 23.7 g. of 14α,17α-ethylidenedioxy-21-acetoxyprogesterone in a mixture of 100 ml. of methanol and 100 ml. of methylene chloride was added under nitrogen 23 ml. of a N solution of sodium methanolate in methanol. The reaction mixture was stirred for 30 minutes under nitrogen at room temperature and then neutralized with acetic acid. The mixture was evaporated to dryness in vacuo and the residue crystallized from methanol/water. Yield: 12.7 g. of 21-hydroxy-14α,17α-ethylidenedioxyprogesterone.

Melting point: 211–215° C.
I.R. (in CHCl$_3$): $\nu_{max}$=3505, 1715, 1668, 1618, 1113 and 1092 cm.$^{-1}$.

(d) A mixture of 40 g. of 21-hydroxy-14α,17α-ethylidenedioxy-progesterone, 600 g. of sodium bismuthate, 1 l. of water and 3 l. of acetic acid was stirred overnight. The reaction mixture was filtered and the filtrate concentrated and extracted with chloroform. The extract was shaken with 5% sodium hydrogen carbonate solution in water, the aqueous layer separated, acidified with 2 N hydrochloric acid and extracted again with chloroform. The latter extract was concentrated to dryness and the residual oil crystallized from methanol/water. Yield: 30 g. of 14α,17α-ethylidenedioxy-4-androsten-3-one-17β-carboxylic acid.

Melting point: 227.5–229° C.

(e) To a stirred suspension of 4.43 of lead tetra-acetate in 75 ml. of refluxing carbon tetrachloride, were added 3.74 g. of 14α,17α-ethylidenedioxy-4-androsten-3-one-17β-carboxylic acid and then 1. 27 g. of iodine. The reaction mixture was illuminated with a tungsten lamp for 2 hours. The cooled reaction mixture was filtered and the filtrate washed with N perchloric acid and water. On evaporation of the solvent a residue was obtained which crystallized from methanol yielding 1.0 g. of 17β-iodo-14α,17α-ethylidenedioxy-4-androsten-3-one.

$\lambda_{max}$ (in methanol) =241 nm.; $E_{1\,cm.}^{1\%}$=315

I.R. (in CHl$_3$): $\nu_{max}$=1668, 1612, 1403 and 1099 cm.$^{-1}$.
N.M.R. (in CDCl$_3$): δ=1.01, 1.19, 1.30 (doublet). 5.20 (quadruplet) and 5.73 p.p.m.
Highest mass number in mass spectrum:
Calculated for C$_{21}$H$_{29}$O$_3$I: 456. Found: 285 [according to molecular weight—171 (i.e. I+CH$_3$CHO); m/e=127 (I$^+$) is also very abundant].

EXAMPLE V

According to the procedure described in Example IVe, 14α,17α-hexylidenedioxy-4-androsten-3-one-17β-carboxylic acid (prepared according to the procedure described in Example IIa) was converted to 17β-iodo-14α,17α-hexylidenedioxy-4-androsten-3-one, isolated as an oil.

$\lambda_{max}$ (in methanol) = 240.5 nm.; $E_{1\ cm.}^{1\%}$ = 320

I.R. (in CHCl$_3$): $\delta_{max}$ = 1661, 1152, 1100, 990, 940 and 862 cm.$^{-1}$.

N.M.R. (in CDCl$_3$): δ = 0.98 (triplet), 1.08, 1.20, 5.01 (triplet) and 5.77 p.p.m.

Highest peak in mass spectrum:
Calculated for C$_{25}$H$_{37}$O$_3$I: 512. Found: 366 [according to molecular weight—(128+18) (i.e. mol. weight HI+H$_2$O)].

EXAMPLE VI

According to the procedure described in Example IVe, 14α,17α-benzylidenedioxy-4-androsten-3-one-17β-carboxylic acid (prepared according to the procedure described in Example IIIa) was converted to 17β-iodo-14α,17α-benzylidenedioxy-4-androsten-3-one, isolated as an oil.

$\lambda_{max}$ (in methanol) = 240.5 nm.; $E_{1\ cm.}^{1\%}$ = 300

I.R. (in CHCl): $\nu_{max}$ = 1735, 1668, 1612 and 1585 cm.$^{-1}$.

N.M.R. (in CDCl$_3$): δ = 1.13, 1.20, 5.75, 5.98 and 7.3–7.6 (multiplet) p.p.m.

Highest mass number in mass spectrum:
Calculter for C$_{26}$H$_{31}$O$_3$I: 5.18. Found: 284 [according to molecular weight—(128+106) (i.e. mol. weight HI+C$_6$H$_5$CHO)].

EXAMPLE VII (a) 2.5 g. of 14α,17α-dihydroxyprogesterone were suspended in a mixture of 50 ml. of acetaldehyde and 0.25 ml. of perchloric acid (70%); the suspension was stirred at room temperature. The steroid was completely dissolved within 1 hour. To the reaction mixture 150 ml. of methyl isobutyl ketone were added; the solution was neutralized with a solution of 1.5 g. of sodium bicarbonate in 30 ml. of water. This solution was washed three times with water and the solvent was completely removed by destillation under reduced pressure. The residue was crystallized from a mixture (1:1) of acetone and water. Yield: 2.0 g. of 14α,17α-ethylidenedioxyprogesterone.

Melting point: 178–181° C.

N.M.R. (in CDCl$_3$): δ = 0.83, 1.19, 1.36 (doublet), 2.17, 5.16 (quadruplet) and 5.74 p.p.m.

(b) A mixture of 0.5 ml. of triethyl orthoformate, 0.03 g. of p-toluenesulphonic acid and 6.5 ml. of dioxane was stirred at room temperature for 1 hour and then 1.0 g. of 14α,17α-ethylidenedioxyprogesterone and 0.5 ml. of triethyl orthoformate were added and the stirring was continued for 1 hour. The mixture was then neutralized with pyridine (0.8 ml.) and poured into 12 ml. of water to give, as a crystalline precipitate, 0.9 g. of 3-ethoxy-14α,17α-ethylidenedioxy-3,5-pregnadiene-20-one.

Melting point: 146.5–150° C.

I.R. (in CHCl$_3$): $\nu_{max}$ = 1711, 1651, 1628, 1169 and 1116 cm.$^{-1}$.

(c) 0.8 g. of 3-ethoxy-14α,17α-ethylidenedioxy-3,5-pregnadiene-20-one was added to a solution of 2.0 g. of hydroxylamine hydrochloride in 16 ml. of 5% sodium hydroxide solution in water; ethanol (48 ml.) was added until a clear solution was obtained. The solution was refluxed for 10 minutes, diluted with water and cooled. Yield: 0.6 g. of 3-ethoxy-20-oximino-14α,17α-ethylidenedioxy-3,5-pregnadiene.

Melting point: 169–185° C.

I.R. (in CHCl$_3$) $\nu_{max}$ = 3587, 1651, 1625, 1404, 1382, 1169 and 1114 cm.$^{-1}$.

(d) A solution of 0.54 g. of 3-ethoxy-20-oximino-14α,17α-ethylidenedioxy-3,5-pregnadiene in 30 ml. methanol was treated with 0.3 ml. of 2 N hydrochloric acid and then refluxed for 10 minutes. The solution was diluted with 60 ml. of water and cooled in a refrigerator. Yield: 0.51 g. of crystalline 20-oximino-14α,17α-ethylidenedioxy-4-pregnene-3-one.

Melting point: 227–230° C.

I.R. (in CHCl$_3$): $\nu_{max}$ = 3588, 1662, 1645, 1613 and 1115 cm.$^{-1}$.

(e) A solution of 5 g. of 20-oximino-14α,17α-ethylidenedioxy-4-pregnene-3-one in 20 ml. of pyridine was treated slowly while stirred at 5–10° C. with a solution of 10 ml. of phosphorous oxychloride in 30 ml. of pyridine and then stirring was continued for 3 hours at room temperature. The mixture was poured into ice water, neutralized with 4 N hydrochloric acid and extracted with chloroform. The extract was washed with water and dried on magnesium sulphate. Evaporation of the solvent yielded an oil, which was chromatographed on alumina, eluting with benzene/ethyl acetate to give an oil which on crystallization from benzene, yield 3.2 g. of 14α,17α-ethylidenedioxy-17β-acetylamino-4-androsten-3-one.

Melting point: 123–125° C.

I.R. (in CHCl$_3$): $\nu_{max}$ = 3439, 1694, 1664, 1615, 1568, 1495 and 1113 cm.$^{-1}$.

(f) A mixture of 5.4 g. of 14α,17α-ethylidenedioxy-17β-acetylamino-4-androsten-3-one, 180 ml. of acetic acid and 60 ml. of acetic anhydride was treated with 16 g. of anhydrous potassium acetate, cooled to 7° C. and then 50 ml. of nitrosyl chloride in acetic anhydride were added dropwise. The mixture was stirred for 2 hours at a temperature between 5° and 10° C. and then for 2 hours at room temperature. The reaction mixture was poured into ice water, neutralized with 4 N sodium hydroxide and extracted with chloroform. The extract was dried on sodium sulphate and the solvent evaporated to give a residue which was triturated with 12 ml. of cold methanol. The crystallized material was filtered and washed with cold methanol to give 1.5 g. of 14α-hydroxy-4-androsten-3,17-dione. The filtrate and the washings were combined, the solvent evaporated and the residue chromatographed on alumina, eluting with benzene/ethyl acetate (2:1) to give, as an amorphous solid, 1.1 g. of 14α,17α-ethylidenedioxy-17β-acetoxy-4-androsten-3-one.

$\lambda_{max}$ (in methanol) = 240 nm.; $E_{1\ cm.}^{1\%}$ = 360

I.R. (in CHCl$_3$): $\nu_{max}$ = 1794, 1665, 1614, 1406, 1369 and 1108 cm.$^{-1}$.

N.M.R. (in CDCl$_3$): δ = 1.00, 1.18, 1.33 (doublet), 2.05, 5.20 (quadruplet) and 5.72 p.p.m.

Molecular ion peak in mass spectrum:
Calculated for C$_{23}$H$_{32}$O$_5$: 388. Found: 388.

EXAMPLE VIII (a) According to the procedure described in Example VIIa, 14α,17α-dihydroxyprogesterone was converted with n-pentanal to 14α,17α-pentylidenedioxyprogesterone.

Melting point: 87.5°–89° C.

I.R. (in CHCl$_3$): $\nu_{max}$ = 1712, 1670, 1616, 1358 and 1112 cm.$^{-1}$.

(b) According to the procedure described in Example VIIb, 14α,17α-pentylidenedioxyprogesterone was converted to 3-ethoxy-14α,17α-pentylidenedioxy-3,5-pregnadiene-20-one.

Melting point: 85–89° C.

I.R. (in CMCl$_3$): $\nu_{max}$ = 1706, 1648, 1622, 1348 and 1108 cm.$^{-1}$.

(c) According to the procedure described in Example VIIc, 3-ethoxy-14α,17α-pentylidenedioxy-3,5-pregnadiene-20-one was converted to 3-ethoxy-20-oximino-14α,17α-pentylidenedioxy-3,5-pregnadiene.

Melting point: 147–150° C.
I.R. (in CHCl$_3$): $\nu_{max}$=3593, 1649, 1623, 1165 and 1105 cm.$^{-1}$.

(d) According to the procedure described in Example VIId, 3-ethoxy - 20 - oximno-14α,17α-pentylidenedioxy-3,5-pregnadiene was converted to 20-oximino-14α,17α-pentylidenedioxy-4-pregnene-3-one.

Melting point: 91–92° C.
I.R. (in CMCl$_3$) $\nu_{max}$=3598, 1665, 1613 and 1107 cm.$^{-1}$.

(e) According to the procedure described in Example VIIe, 20-oximino-14α,17α-pentylidenedioxy-4-pregnene-3-one was converted to amorphous 14α,17α-pentylidenedioxy-17β-acetylamino-4-androsten-3-one.

$\lambda_{max}$ (in methanol) = 240 nm.; $E_{1\,cm.}^{1\%}$ = 345

I.R. (in CHCl$_3$): $\nu_{max}$=3440, 1709, 1665 and 1610 cm.$^{-1}$.

(f) According to the procedure described in Example VIIf, 14α,17α-pentylidenedioxy-17β-acetylamino-4-androsten-3-one was converted to amorphous 14α,17α-pentylidenedioxy-17β-acetoxy-4-androstene-3-one.

$\lambda_{max}$ (in methanol) = 242 nm.; $E_{1\,cm.}^{1\%}$ = 325

I.R. (in CHCl$_3$): $\nu_{max}$=1750, 1662, 1612, 1362, 1160, 1121, 1105, 1050, 1000, 938, 890 and 860 cm.$^{-1}$.
N.M.R. (in CDCl$_3$): δ=0.90 (triplet), 1.00, 1.18, 2.05, 5.02 (triplet) and 5.75 p.p.m.
Molecular ion peak in mass spectrum:
Calculated for C$_{26}$H$_{38}$O$_5$: 430. Found: 430.

EXAMPLE IX (a) According to the procedure described in Example VIIa, 14α,17α-dihydroxprogesterone was converted with benzaldehyde to 14α,17α-benzylidenedioxyprogesterone.

Melting point: 182.5°–185.5° C.
I.R. (in CHCl$_3$): $\nu_{max}$=1715, 1668, 1620, 1452, 1360 and 1020 cm.$^{-1}$.

(b) According to the procedure described in Example VIIb, 14α,17α-benzylidenedioxyprogesterone was converted with trimethyl orthoformate to 3-methoxy-14α,17α-benzylidenedioxy-3,5-pregnadiene-20-one.

Melting point: 136°–141° C.
I.R. (in CHCl$_3$): $\nu_{max}$=2843, 1705, 1650, 1623 and 1166 cm.$^{-1}$.

(c) According to the procedure described in Example VIIc, 3-methoxy - 14α,17α - benzylidenedioxy-3-5-pregnadiene-20-one was converted to 3-methoxy-20-oximino-14α,17α-benzylidenedioxy-3,5-pregnadiene.

Melting point: 190–200° C.
I.R. (in CMCl$_3$): $\nu_{max}$=3590, 2845, 1653, 1627, 1085 and 983 cm.$^{-1}$.

(d) According to the procedure described in Example VIId, 3 - methoxy-20-oximino-14α,17α-benzylidenedioxy-3,5-pregnadiene was converted to 20-oximino-14α,17α-benzylidenedioxy-4-pregnene-3-one.

Melting point: 238–243° C.
I.R. (in CHCl$_3$): $\nu_{max}$=3590, 1663, 1632, 1612, 1085 and 985 cm.$^{-1}$.

(e) According to the procedure described in Example VIIe, 20-oximino-14α,17α-benzylidenedioxy - 4 - pregnene-3-one was converted to 14α,17α-benzylidenedioxy-17β-acetylamino-4-androsten-3-one.

Melting point: 147.5–150.5° C.
I.R. (in CHCl$_3$): $\nu_{max}$=3433, 1740, 1698, 1668 and 1613 cm.$^{-1}$.

(f) According to the procedure described in Example VIIf, 14α,17α-benzylidenedioxy-17β-acetylamino-4-androsten-3-one was converted to 14α,17α-benzylidenedioxy-17β-acetoxy-4-androsten-3-one.

Melting point: 113–116° C.

$\lambda_{max}$ (in methanol) = 240 nm.; $E_{1\,cm.}^{1\%}$ = 420

I.R. (in CHCl$_3$): $\nu_{max}$=1750, 1665, 1612 and 1368 cm.$^{-1}$.
N.M.R. (in CDCl$_3$): δ=1.08, 1.22, 2.06, 5.74, 6.02 and 7.4–7.6 (multiplet) p.p.m.
Molecular ion peak in mass spectrum:
Calculated for C$_{28}$H$_{34}$O$_5$: 450. Found: 450.

The invention includes with its scope pharmaceutical preparations containing, as the active ingredient, at least one of the therapeutically active compounds of Formula 1 in association with a pharmaceutically acceptable carrier. The preparations may take any of the forms customarily employed for administration of therapeutically active substances but the preferred types are those suitable for oral administration, especially tablets, including sustained release tablets, pills and capsules including the substance and those suitable for parenteral administration. The tablets and pills may be formulated in the usual manner with one or more pharmaceutically acceptable diluents or excipients, and include materials of a lubricating nature. Capsules made of absorbable material, such as gelatin, may contain the active substance alone or in a mixture, with a solid or liquid diluent. Liquid preparations may be in the form of suspensions, emulsions, syrups or elixirs of the active substance in water or other liquid medium commonly used for making orally acceptable pharmaceutical formulations.

The active substance may also be made up in a form suitable for parenteral administration, i.e. as a suspension or emulsion in sterile water or an organic liquid usually employed for injectable preparations, for example a vegetable oil such as corn or olive oil, or a sterile solution in water or an organic solvent.

For adult human therapy, the compounds may be administered orally in daily dosages such as tablets of 3 to 25 mg.; the compounds may also be administered parenterally, subcutaneously or intramuscularly in the form of a depot preparation containing from 300 to 750 mg. of active substance, as a crystal suspension in water of dissolved in a very pure oil, such as corn oil.

What we claim and desire to secure by letters patent is:

1. 14α,17α-methylenedioxy-androstane derivative of the formula wherein R represents an aliphatic hydrocarbon group having less than 6 carbon atoms or a phenyl group and R$_1$ represents an acetoxy group or a halogen atom.

2. 14α,17α-methylenedioxy derivative in accordance with claim 1 wherein said derivative is 14α,17α-ethylidenedioxy-17β-acetoxy-4-androsten-3-one.

3. 14α,17α-methylenedioxy derivative in accordance with claim 1 wherein said derivative is 14α,17α-pentylidenedioxy-17β-acetoxy-4-androsten-3-one.

4. 14α,17α-methylenedioxy in accordance with claim 1 wherein said derivative is 14α,17α-benzylidenedioxy-17β-acetoxy-4-androsten-3-one.

5. 14α,17α-methylenedioxy derivative in accordance with claim 1 wherein said derivative is 17β-chloro-14α,17α-ethylidenedioxy-4-androsten-3-one.

6. 14α,17α-methylenedioxy derivative in accordance with claim 1 wherein said derivative is 17β-chloro-14α,17α-hexylidenedioxy-4-androsten-3-one.

7. 14α,17α-methylenedioxy derivative in accordance with claim 1 wherein said derivative is 17β-chloro-14α,17α-benzylidenedioxy-4-androsten-3-one.

8. 14α,17α-methylenedioxy derivative in accordance with claim 1 wherein said derivative is 17β-iodo-14α,17α-ethylidenedioxy-4-androsten-3-one.

9. 14a,17a-methylenedioxy derivative in accordance with claim 1 wherein said derivative is 17β-iodo-14α,17α-hexylidenedioxy-4-androsten-3-one.

10. 14α,17α-methylenedioxy derivative in accordance with claim 1 wherein said derivative is 17β-iodo-14α,17α-benzylidenedioxy-4-androsten-3-one.

11. 3 - alkoxy - 14α,17α - methylenedioxy-3,5-pregnadiene-20-oximino derivative of the formula

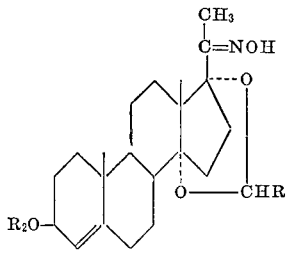

wherein R represents an aliphatic hydrocarbon having less than 6 carbon atoms or a phenyl group and $R_2$ represents an alkyl group having less than 5 carbon atoms.

12. 14α,17α - methylenedioxy - 4 - androsten - 3-one-17β-carboxylic acid of the formula

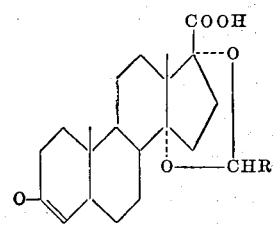

wherein R represents an aliphatic hydrocarbon having less than 6 carbon atoms or a phenyl group.

References Cited
FOREIGN PATENTS
6703781   9/1968   Netherlands.

ELBERT L. ROBERTS, Primary Examiner
E. G. LOVE, Assistant Examiner

U.S. Cl. X.R.
260—397.1, 397.47; 204—158; 424—241